April 4, 1967  L. P. BARLOW  3,312,204
INTERNAL COMBUSTION PROCESS AND APPARATUS PERMITTING THE USE
OF FASTER BURNING FUELS THAN ARE NORMALLY USED IN
HIGH-COMPRESSION AUTOMOTIVE GASOLINE ENGINES
Filed July 28, 1966  5 Sheets-Sheet 3
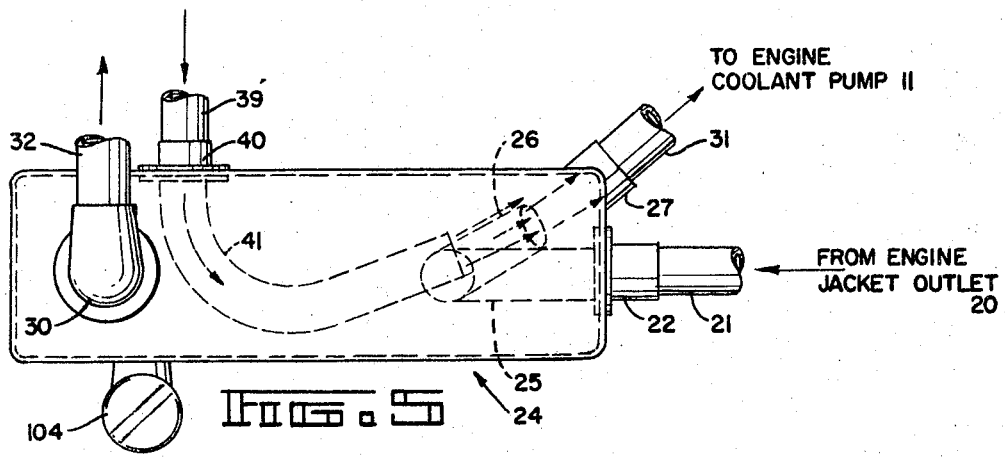
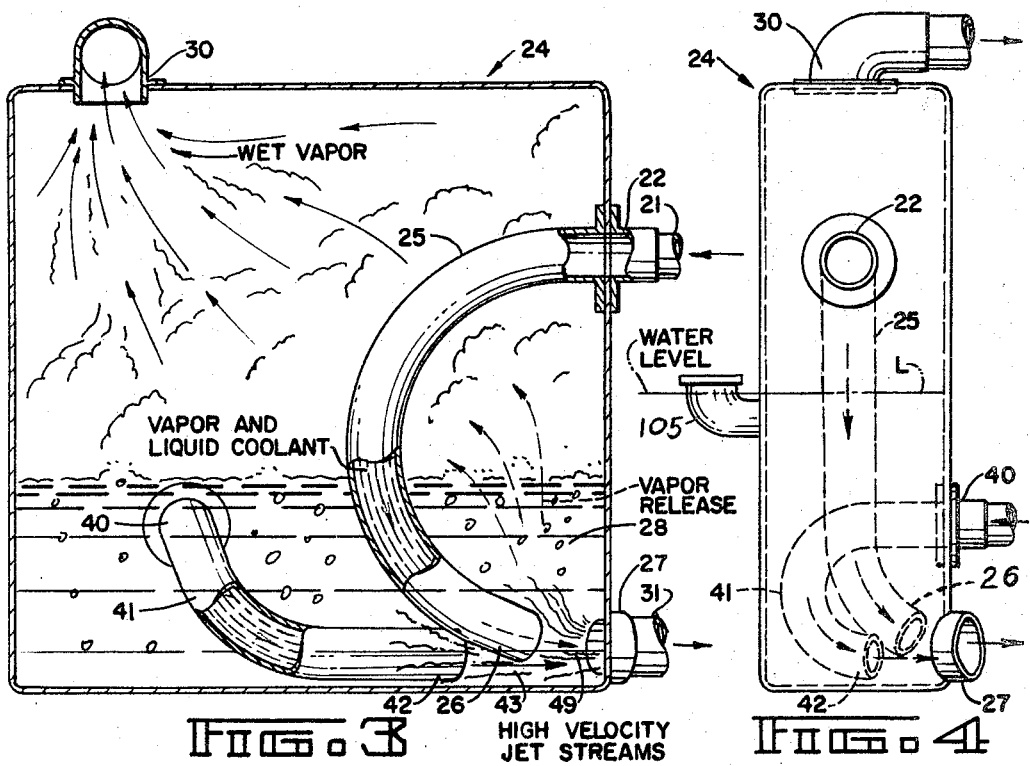
INVENTOR
LESTER P. BARLOW
BY
Robertson, Bryan, Parmelee & Johnson
ATTORNEYS.

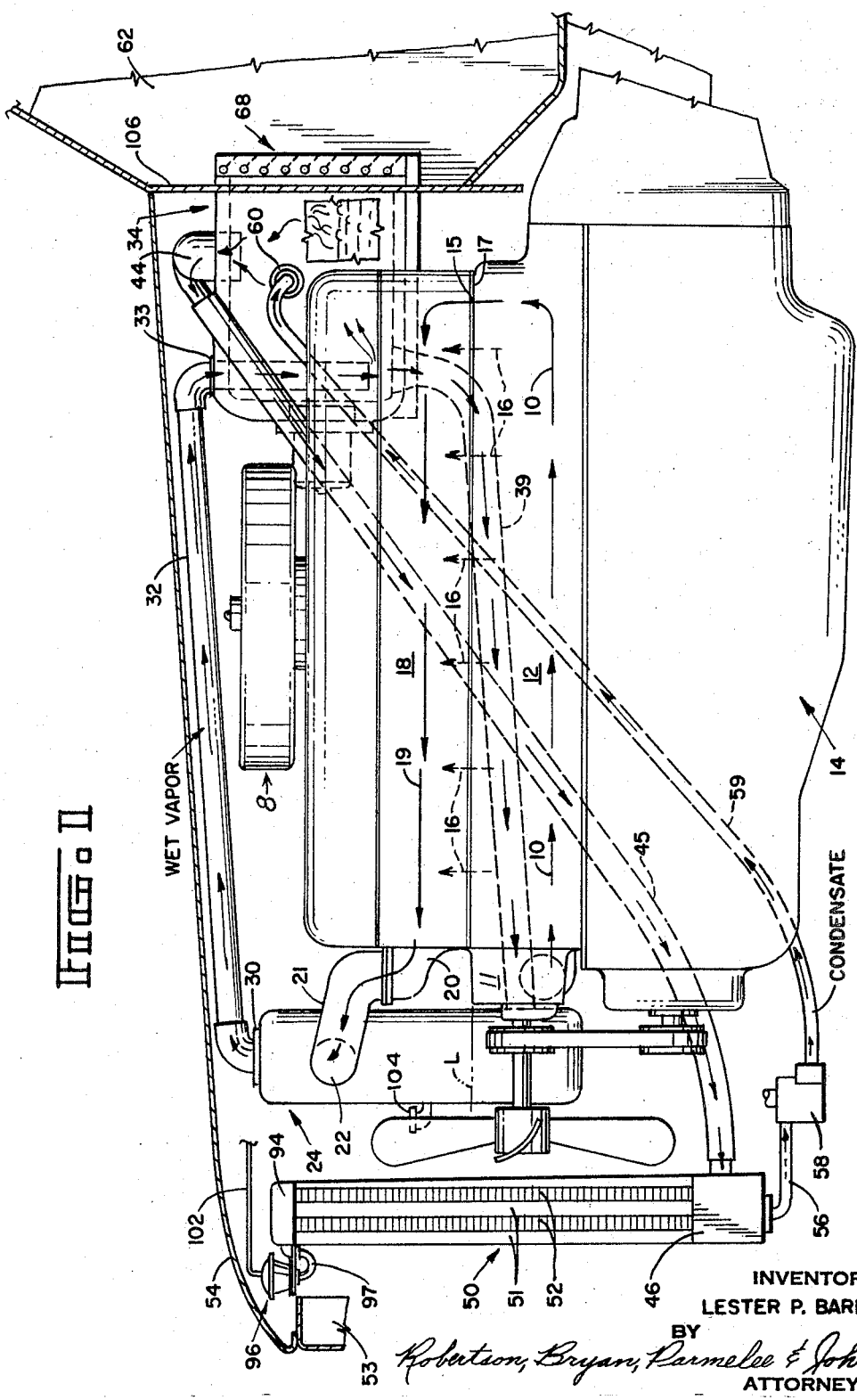

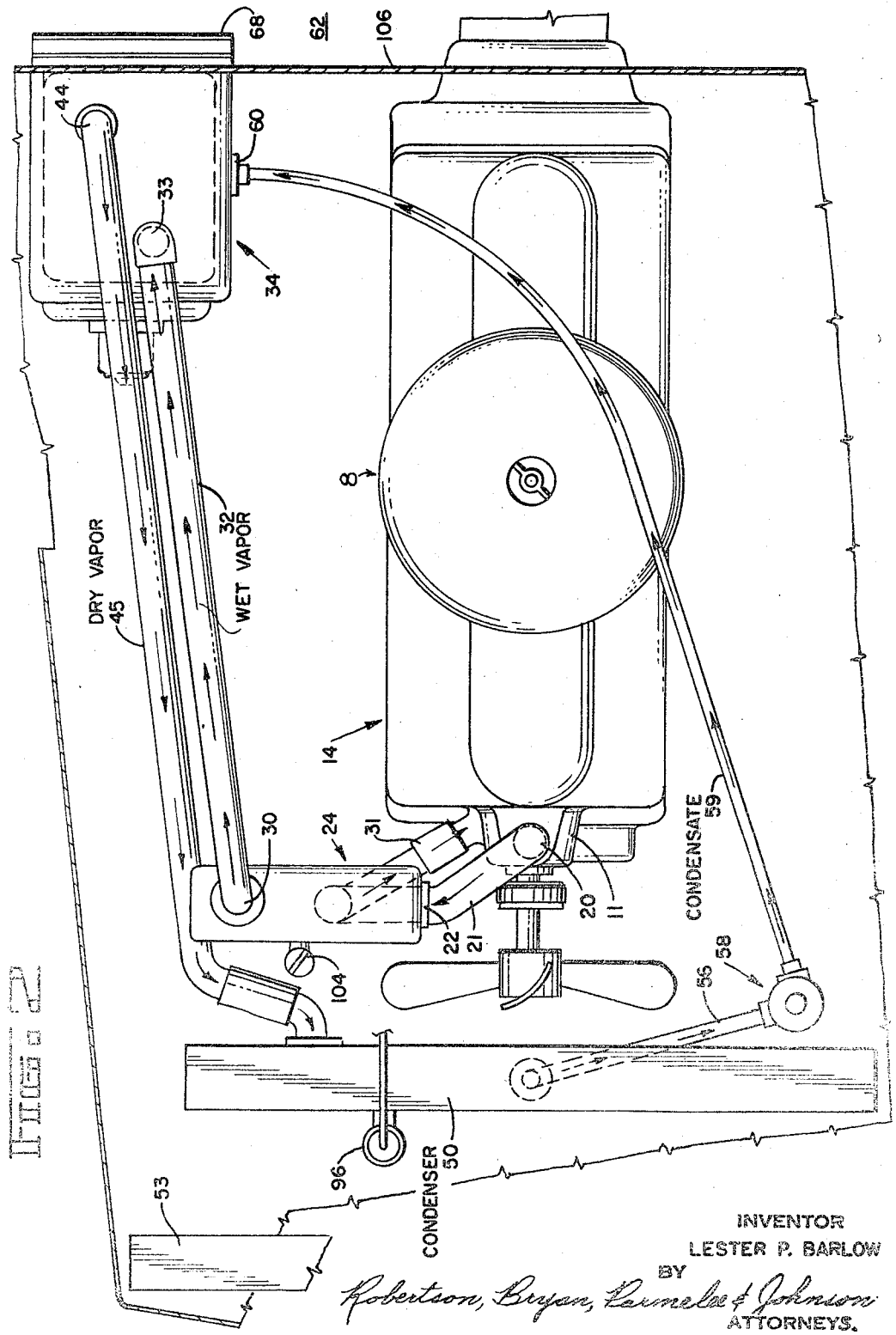

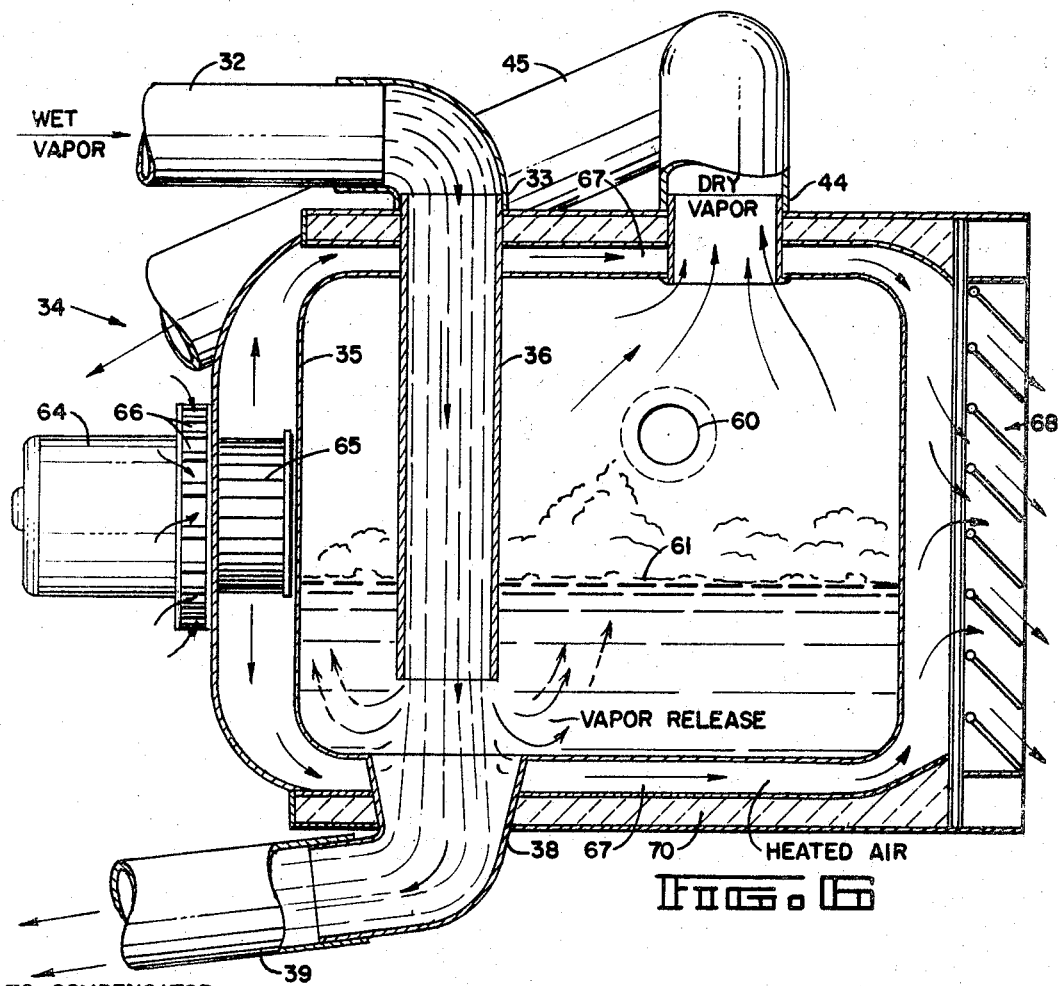
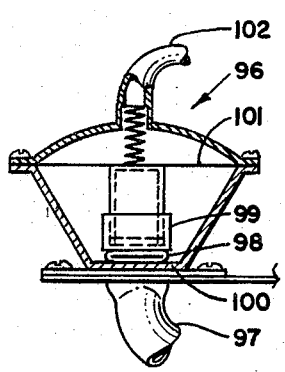

3,312,204
INTERNAL COMBUSTION PROCESS AND APPARATUS PERMITTING THE USE OF FASTER BURNING FUELS THAN ARE NORMALLY USED IN HIGH-COMPRESSION AUTOMOTIVE GASOLINE ENGINES
Lester P. Barlow, Stamford, Conn., assignor to The Barlow Vapor Cooling Company, Stamford, Conn., a corporation of Connecticut
Filed July 28, 1966, Ser. No. 568,684
17 Claims. (Cl. 123—41.25)

The present invention relates to an internal combustion process and apparatus permitting the use of faster burning hydrocarbon fuels than are normally used in high-compression automobile and marine gasoline engines of the reciprocating type, to produce more complete combustion than in a conventional engine of equivalent rating burning conventional hydrocarbon fuel containing knock suppressant materials and to provide a substantial increase in mileage per gallon of fuel.

The tests which I have run utilizing the present invention in a 1965 Oldsmobile Jetstar automobile containing a gasoline engine rated by the manufacturer as being a 385 horsepower engine with a high-compression ratio of 10.5 to 1 have shown that this process provides an increase in gasoline mileage of better than 14% due to the more complete combustion of the fuel in the engine as compared with the prior operation of this engine using conventional "premium" fuel containing lead and anti-knock material. Moreover, by employing the invention in this engine it became substantially easier to start during cold weather.

It is known that the power output and thermal efficiency of internal combustion engines of the reciprocating type are increased by raising its compression ratio. As a result of the increased compression ratio, more useful energy can be extracted from the fuel during the power stroke, because the combustion begins at higher temperatures and pressures than in the case of a lower compression engine.

It has been the experience of the automotive and gasoline industries, however, that penalties must be paid for higher compression ratios. The fuel mixture has tended to pre-ignite during the compression stroke, causing excessively high pressures, leading to detonation of the unburned fuel as the piston nears the top of its stroke. This detonation ("knock") places severe momentary stresses on the piston head and cylinder and has been known to collapse the piston head. For high compression ratios exceeding 8.5 to 1 the practice has been to use fuel having an inherently high anti-knock quality, of which only a limited amount is available in known petroleum reserves, causing an added cost of operation, or to use fuel of lower anti-knock quality to which is added knock suppressant material, such as tetraethyl lead or the like. The practice has been to use increased amounts of anti-knock material, usually leaded material, per gallon in fuels intended for use in engines of higher compression ratios. These leaded fuels have been considered "premium" fuels and have been of increased cost to the consumer as compared with fuels of lower anti-knock characteristics.

Such additives raise the ignition temperature of the fuel-air mixture so as to resist or inhibit pre-ignition during normal operation, but the energy level and temperature of the ignition spark are sufficiently high to ignite the fuel mixture containing such additives. An undesired effect of the lead additive has been to slow down the effective rate of burning of the fuel during the power stroke.

In order to compensate in part for this undesired slow burning rate of the leaded fuel mixture, the timing of the ignition spark has been advanced during running so that the spark occurs before the piston reaches its top position. The advance has usually been a substantial number of degrees of crankshaft rotation ahead of the top piston position. Thus, the fuel-air mixture begins burning before the piston reaches the top of its stroke and continues burning as the piston reaches the top of its stroke and as it travels down during the power stroke. That portion of the combustion which occurs before top dead center position raises the pressure during compression, which undesirably opposes crankshaft rotation, thus wasting some of the fuel energy.

This advance of the spark is for the purpose of providing the maximum possible length of time for the leaded fuel to ignite and burn. For example, in a four-cycle engine operating at 3,000 revolutions per minute, or 50 revolutions per second, each power stroke from top to bottom lasts $\frac{1}{100}$ of a second. At higher speeds, of course, the time for the power stroke is progressively less. As a practical matter the effective power stroke is somewhat less than the length of time from top to bottom of piston movement because of the opening of the exhaust valve occurring before bottom dead center. In spite of the advance spark, there is not sufficient time for complete combustion of leaded fuel, and a portion of the leaded fuel remains incompletely burned and passes into the atmosphere as carbon monoxide and unburned hydrocarbons, and the discharged products carry lead oxide into the atmosphere.

A further problem with the use of leaded fuels is that they form deposits in the combustion area, on the exhaust valve, on the piston head, and on the electrodes and insulator support of the spark plug. As a result of incomplete combustion, there are also carbon deposits mixed with the lead oxide in the combustion area which form incandescent points or "hot spots" within the combustion region of the cylinder, thus raising the effective compression ratio and also reducing the heat transfer from the combustion region at localized places to form such hot spots. These incandescent points tend to further pre-ignition of the fuel mixture. Thus, as the lead deposits and carbon build up, the anti-knock level of the fuel must be further increased. This phenomenon has been referred to as the increasing octane demand of the engine resulting from accumulated operating time. The use of increased amounts of lead additives temporarily overcomes the difficulty of pre-ignition, but they augment the basic problem of the deposits formed within the engine. Various additives have been employed in an effort to inhibit the formation of deposits or to reduce their tendency toward pre-ignition of the fuel, but these additives are not a solution to the basic problem. They merely treat the symptoms. Their usage is an inherent acknowledgment by the prior art of the inability to overcome the fundamental problems.

I have discovered an internal combustion process which enables non-leaded fuels of low octane quality to be burned in high-compression engines, tending to minimize the above problems.

Instead of fighting against the fast-burning fuel's tendency to knock, this invention enables these characteristics to be utilized to improve the efficiency of the engine and to reduce pollution of the atmosphere. The very charactertsitics of the fuel which have been considered detrimental by the prior art now become advantages.

In contrast with the conventional high-compression engines which require a combustion suppressant, such as tetraethyl lead or the like and an advanced spark, an engine employing the present invention uses fuels which are free of such combustion suppressants, and it has the spark timed to occur at effectively top dead center. The result is that a larger percentage of the fuel is burned during the power stroke and a greater efficiency is provided, that is, an increase in mileage per gallon of fuel under equivalent conditions. Also, a reduced amount of air pollution results from engines of equivalent power when employing this invention.

In a high-compression engine employing this invention the fuel is ignited by the spark when the piston is at the top of its stroke, while the fuel-air mixture is fully compressed and the fuel is substantially more gasified (vaporized) than in a conventional engine using conventional fuel containing anti-knock suppressants, and so the fuel can burn at a fast rate. During this very brief period of time the piston itself is moving down the cylinder thus controlling the abrupt rise in pressure by the downwardly moving piston, thereby preventing knock. I have found in my recent experiments with a high compression automobile engine, that the higher combustion temperature of such engines is an aid in obtaining the desired high velocity burning speed of the combustion of synthetic cracked gasolines with their content of heavier hydrocarbon molecules. An extremely fast combustion is produced and more of the energy in the fuel is extracted by its thrust against the fast-moving piston during the power stroke.

As a result of the more complete combustion of the fuel, a reduced amount of carbon monoxide and unburned hydrocarbons are released into the atmosphere. In addition, the use of lead is eliminated, thus stopping the contamination of the atmosphere with lead and avoiding lead deposits in the engine.

In the practice of my invention the engnie is cooled with a coolant liquid, such as water, at the temperature of its boiling point, as described in my Patent No. 3,223,075. Such a cooling system takes advantage of the latent heat of vaporization, the heat ncecessary to change liquid to vapor without a change in temperature. Since the coolant throughout the cylinder jacket is at its boiling point the heat which it absorbs merely transforms the coolant to its vapor state, the vapor being lighter than liquid boils off the top, and the coolant around the cylinder walls remains at a uniform temperature from top to bottom. In addition, in the system as described herein, the coolant liquid at its boiling point and its vapor are directed at high velocity through the cylinder head jacket so that there is an intense scrubbing of the vapor plus liquid against the jacket surfaces near the valve seats and spark plug mountings.

It may seem a paradox, but an engine which employs the present inventon has its cylinder walls at a higher temperature than a conventional engine but its head, valves, and spark plugs are at a lower temperature than in a conventional engine. My theory for explaining this apparent contradiction will be described below, but regardless of whether my theory is correct, the advantageous engine operation is obtained by following the teaching of this specification. As the coolant liquid at its boiling temperature is passing through the jacket around the cylinder walls, it picks up heat from the cylinder walls, and this heat energy causes some of the coolant to be converted to vapor with a consequent great increase in volume. As more heat is taken up by the coolant progressively more vapor is produced with a progressive greater increase in volume. This progressive increase in volume violently propells the vapor and coolant liquid at its boiling point through the jacket toward the outlet, cauisng them to speed up to a high velocity. Also, this mixture of vapor and coolant liquid at its boiling point are directed up through small orifices in the head gasket, and are jetted into the head jacket near the spark plug mountings. The resultant intense scrubbing of the high speed coolant vapor and entrained liquid against the walls of the head jacket keep these surfaces clean and provide an efficiency of heat transfer which is higher than in a conventional engine. It turns out that the head components are cooler than in a conventional engine.

My theory is that the higher-than-conventional and constant uniform temperature of the cylinder walls vaporizes the fuel more completely during intake and compression, and the lower-than-conventional temperature of the head and associated elements, valves and spark plugs enables the fuel in substantial absence of knock suppressant material to be compressed to a high-compression ratio, for example 10.5 to 1, without knocking under load and fuel conditions which would ordinarily cause severe knocking in a conventional engine of the same high-compression ratio. Then this thoroughly vaporized fast burning and highly compressed fuel-air mixture will burn at an intense rate approaching detonation when it is ignited by the spark which is timed to occur when the piston it at top dead center.

Tests with the engine of my invention show that a non-leaded synthetic cracked gasoline of low octane rating can be used in a high-compression engine under equivalent load conditions which would produce severe knocking in a conventional engine, and results in increased efficiency.

For the most striking increase in engine efficiency it is desirable to use fuel having a boiling point or points 120° F. to approximately 400° F., when water or other liquid coolant having a boiling point approximately that of water is employed as the coolant, because more complete vaporization of the fuel occurs in preparation for the fast burning thereof during the power stroke. Fuels having even higher boiling points can be used to advantage as compared with the use of the same fuel in a conventional high-compression engine.

The present invention enables one grade of gasoline fuel to be used winter and summer by all automotive engines employing ebullient cooling, regardless of the number or arrangement of cylinders. Various different cracked synthetic gasoline fuels with boiling points between approximately 120° F. and 400° F., or even 450° F., can be blended by the fuel refineries so that a common standard cracked gasoline fuel can be available throughout the nation, or the world, for use by all ebullient cooled automotive engines. Such blending to produce a common standard fuel will aid in lowering air pollution by automobile exhaust fumes because the ebullient cooled automotive engines provide substantially constant and uniform combustion conditions matching with the fuel. The designers and builders of automotive engines will know the characteristics of the fuel to be used and accordingly can make specific improvements. The result can be a vast economy in shipment and storage of one common standard gasoline fuel and convenience and savings for the users of automobiles and motor boats.

Among the advantages provided by the present invention in brand new engines is the absence of lead deposits upon the exhaust valves, enabling them to engage their seats with increased thermal conductivity for more effective cooling of the valves. An absence of lead deposits on the spark plug insulator and electrodes provides retention of the desired dielectric characteristics to resist arc-over on the insulator surface. Only a trace of carbon can be seen when the combustion chambers are opened, and such carbon is soft and can be mostly wiped off down to the metal with a soft rag.

Another advantage of the present invention is that it enables substantially all automobiles now on the highway and having liquid cooled engines to be equipped to employ this invention with a very few, if any, minor changes in the engine.

In accordance with the present invention, the process of increasing the efficiency of a high-compression internal combustion engine of the reciprocating piston type having a compression ratio greater than 8.5 to 1 comprises the steps of charging the high compression engine with a mixture of air and hydrocarbon fuel in the substantial absence of knock suppressants to produce a fast-burning detonatable mixture, cooling the engine with a coolant liquid at its boiling point, accelerating the vaporization of the fuel by the warm cylinder wall temperature, compressing the mixture to a high compression level in the respective cylinder, igniting the compressed vaporized mixture at approximately the time of maximum compression in the respective combustion areas, and burning the mixture during the downward power stroke of the piston in such areas.

In accordance with the present invention in another of its aspects, the improved cooling system described herein is arranged to conserve heat energy so that more of the energy of the fuel is harnessed as useful power to drive the car as compared with a conventional water-cooled engine. Also, this improved cooling system provides increased cooling capacity adapted to handle the large power surges of high power engines while minimizing the number of quarts of coolant being utilized.

In this specification and in the accompanying drawings, are described and shown an illustrative embodiment of my invention in internal combustion process and apparatus permitting the use of faster burning fuels than are normally used in high compression automotive gasoline engines and providing increased efficiency in high-compression automobile engines and the like, but it is to be understood that this disclosure is not intended to be exhaustive nor limiting of the invention, but on the contrary is given for purposes of illustration in order that others skilled in the art may fully understand the invention and the manner of applying the process and apparatus in practical use and so that they will understand how to modify and adapt these in various forms, each as may be best suited to the conditions and characteristics of a particular high-compression engine.

Other features, aspects and advantages of the present invention will become apparent from the following description of the present embodiment thereof, considered in conjunction with the drawings which accompany and form part of the specification.

In the drawings:

FIGURE 1 is a side view of a high-compression automobile engine embodying the present invention;

FIGURE 2 is a top view of the engine;

FIGURE 3 is an enlarged front view of the compensating chamber, which is seen in FIGURES 1 and 2 positioned immediately behind the plane of revolution of the fan blades;

FIGURES 4 and 5 are side and top views of the compensating chamber of FIGURE 3;

FIGURE 6 is an enlarged elevational sectional view of the automobile heater, which is seen in FIGURES 1 and 2 to be positioned near the passenger compartment;

FIGURE 7 is an illustration of a vacuum-controlled spring plug for preventing loss of coolant when the engine is shut off due to heat stored in the engine parts;

FIGURE 8 is an elevational sectional view of a condensate pump shown on enlarged scale.

Figure 88:
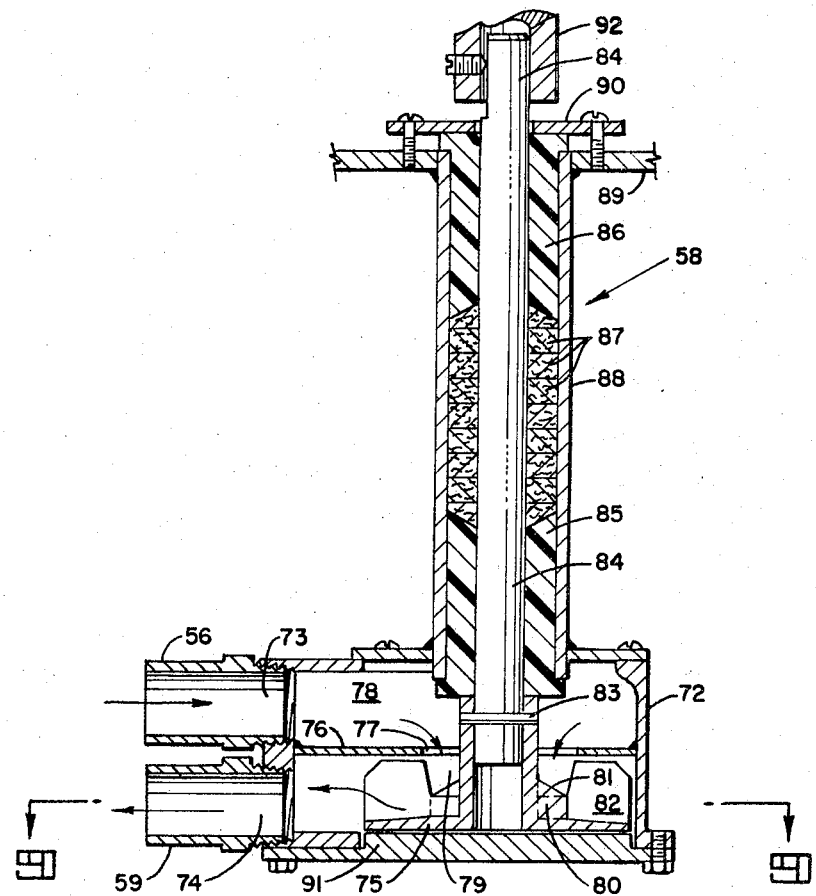

FIGURES 1 and 2 show a high-compression automobile engine 14 having a compression ratio exceeding 8.5 to 1 employing the process of the present invention permitting the use of faster burning gasoline fuels than are normally used in such high-compression engines. The engine includes a conventional air intake and carburetor 8, and it includes a conventional ignition system, except that the timing of the ignition spark is set at a predetermined time to occur effectively at top dead center of the piston stroke in each cylinder. The hydrocarbon fuel being burned is devoid of anti-knock additives, such as lead tetraethyl. The fuel does not detonate ("knock") during the compression stroke, and upon ignition by the spark at the conclusion of the compression stroke, the fuel burns at a fast rate, whereby the mileage per gallon is increased and the released air contaminants are reduced.

The cooling system includes several novel features. As shown by the flow arrows 10 in FIGURE 1 the coolant liquid at its boiling temperature is pumped by a conventional coolant pump 11 into the cooling jacket 12 surrounding the cylinder walls of the high-compression engine 14. The coolant liquid absorbs heat from the engine and progressively greater volumes of vapor become mixed with the coolant flow to increase its velocity, as mentioned in the introduction. The resulting high velocity mixture of vapor and liquid is passed up through an opening 15 in cylinder head gasket 17 and into the head jacket 18 so that there is an intense scrubbing of the coolant mixture against the interior surfaces of the head jacket as it flows forward at high speed as indicated by the arrows 19. In this engine there are also small orifices in the head gasket 17. These orifices are positioned near the location of the respective spark plug mountings for applying additional cooling action 16 to the spark plugs.

The high velocity flow 19 of the coolant, both liquid and vapor passed forward out through a jacket outlet 20 and through connection means 21 into the inlet 22 of a compensating chamber 24. This outlet 20 may be the same size as in a conventional engine, but I prefer to enlarge this outlet somewhat so as to allow the high velocity flow 19 to occur without any substantial back pressure. As seen in FIGURES 3, 4 and 5, this high velocity flow continues through a duct 25 within the compensating chamber which is curved to have its discharge end 26 aimed toward a bottom outlet port 27.

The coolant vapor 28 breaks away from the liquid after jetting out of the discharge nozzle 26, and this vapor goes to the upper part of the conpensating chamber 24 where there is an outlet 30 for the wet vapor. The coolant liquid is driven by the jet stream 49 out through the bottom outlet port 27 having a connection 31 directly into the engine pump 11. This pump is a conventional automobile cooling pump. The coolant liquid being propelled from the compensating chamber 24 through the port 27 is at its boiling temperature and carries some entrained vapor back through the pump 11 into the jacket 12. The pressure with which the coolant liquid is driven through the connection means 31 into the pump 11 prevents the pump from becoming vapor bound.

The wet vapor from the compensating chamber 24 flows at high speed out of the upper outlet 30 and through tubing connection means 32 to an inlet 33 (FIGURE 6) of a combination expansion tank and car heater unit 34. Within this unit 34 is a tank 35, and the wet vapor flows with force downward through a duct 36. Below the lower end of this duct 36 the liquid and vapor separate, with some of the liquid remaining in the bottom of the tank 35 and some of the liquid being propelled down out of a return port 38 to be returned as hot liquid through tubing connections means 39 to a second inlet 40 (FIGURES 3, 4 and 5) into the compensating chamber 24.

The hot liquid passes through a second curved duct 41 within the compensating chamber having its discharge end 42 aimed toward the outlet 27 and positioned adjacent to the other nozzle 26 so that a stream 43 of hot liquid merges with the jet 49 in flowing out of the outlet port 27 toward the engine pump 11 and thus back into the jacket circulation path. It is noted that the outlet port 27 has a larger size than the discharge end 26 or 42 so that the jet streams 49 and 43 can readily entrain liquid coolant to be returned from the compensating chamber 24 to the engine jacket 12.

Within the tank 35 (FIGURE 6) dry vapor flows out of the top outlet 44 and down through tube connection means 45 to the bottom collector pan 46 of a vapor condenser 50.

Advantageously, the compensating chamber 24 plus the expansion tank 35 serve as two coolant liquid traps in cascaded relationship. They prevent any substantial amount of the hot liquid from reaching the condenser 50, and so they conserve heat energy (B.t.u.'s), which helps in increasing engine efficiency by preventing waste of heat energy. Thus, only substantially dry vapor reaches the multiple vertical cooling passages 51 of the condenser 50 extending up from the collector 46. As the vapor flows up these passages 51, it loses its heat of vaporization and moves only a relatively short distance before it becomes condensed and falls back down into the collector 46 as condensate liquid at just below its boiling point. The condenser passages 51 have associated external fins 52 of metal of good heat conductivity, such as copper or aluminum, for dissipating the heat of vaporization into the air stream passing through the condenser 50. The car is shown as including a conventional front grill 53 and a conventional low hood 54.

Figure 9:
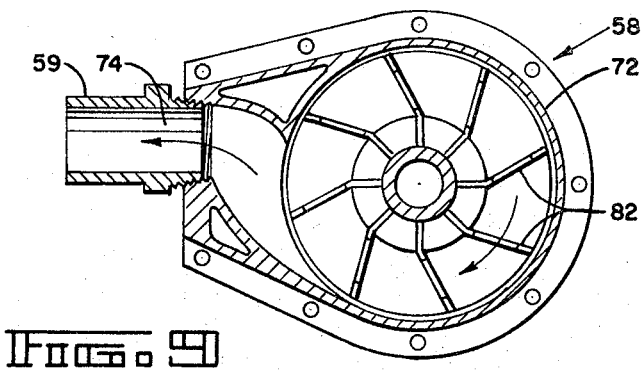
FIGURE 9 is a cross section taken along the line 9—9 through the impeller.

It will be appreciated that the condensate liquid is at a temperature only just slightly below its boiling point. From the collector pan 46 the hot condensate liquid flows down through a pipe 56 into a condensate pump 58. This pump 58 is shown in detail in FIGURES 8 and 9 and will be described further below. This pump 58 sends the liquid up through small diameter tubing 59 and through an inlet 60 into the expansion tank 35 near the top of this tank at a level which is above the normal operating liquid level 61 therein.

For heating the passenger compartment 62, there is an electrical heater motor 64 driving a blower wheel 65. The air is drawn in through openings 66 and is impelled by the blower 65 through passageway 67 adjacent to the tank 35. This air becomes heated, and the amount of heated air flowing into the passenger compartment 62 is set by control means, for example, such as an adjustable louvre 68, to control the temperature in the passenger compartment as desired. An advantage of this heater apparatus 34 is that the tank 35 is always at substantially the same temperature, summer of winter, at slow car speed or high car speed, at light or heavy engine loads, being at the boiling temperature of the coolant liquid. A layer of thermal insulation 70 surrounds the unit 34 to conserve heat energy.

The condensate pump 58 (FIGS. 8 and 9) includes a casing 72 having an intake 73 connected to the pipe 56 and a discharge 74 to tubing 59. A centrifugal impeller 75 is mounted in a lower chamber beneath a horizontal partition shelf 76 which includes a large central opening 77. Thus, the condensate liquid entering an upper chamber 78 falls by gravitation through the opening 77 so as to fall down into an annular clearance space about the impeller hub 80. This hub has a downwardly and outwardly sloped upper surface 81 which forces the falling liquid to travel outwardly into engagement with a plurality of impeller blades 82 which project up around the annular space 79. The revolving blades are inclined backwardly (FIG. 9), and they propel the liquid by centrifugal force out through the discharge port 74.

The impeller 75 is pinned at 83 to the lower end of a drive shaft 84 extending up through sleeve bearings 85 and 86 with rings of asbestos and graphite lubricated packing 87 between them. A tubular bearing support 88 is secured to the casing 72 and to a mounting bracket 89, and a yoke clamp element 90 holds the bearings and packing in place. An electric motor (not shown) is attached to the upper end of the shaft 84 for driving the impeller 75. A removable bottom closure plate 91 covers the bottom of the impeller chamber. The various parts of this condensate pump 58 are made of stainless steel, except the bearings 85 and 86 are Teflon and the packing 87 is fibrous.

At the top of the vapor condenser 50 there is a header chamber 94 connected to the passages 51, and a vacuum-controlled spring plug 96 (FIGURE 7) serves to prevent loss of coolant when the engine is shut off. This type of valve is also shown in my Patent No. 3,223,075. An air vent line 97 with a one-way valve 98 is connected to the header 94 at a point remote from the condensing surfaces in order to prevent pressure from building up within the cooling system to too high a degree and also to prevent air of the atmosphere from entering the system. In order to reduce to a minimum loss of coolant through the air vent 97 during the momentary rise in pressure in the cooling system due to the latent heat remaining in the system after the engine has been shut down, the valve 98 allows pressure to build up to a low level when the engine is running and to a somewhat increased level when the engine is shut down.

The flexible tubular valve 98 at the end of the line 97 in inserted between two members 99 and 100, the bottom member 100 being stationary and the top member 99 being a plug connected to one side of a spring biased diaphragm 101. On the other side of the diaphragm 101 there is a connection 102 to the vacuum side of the engine manifold so that when the engine is operating the vacuum acts to draw the diaphragm 101 to relieve the pressure exerted against the flexible tubular valve 98, at which time the valve is set for a suitable low pressure, for example of approximately one-half pound per square inch. When the engine stops and the vacuum is cut off, the diaphragm is no longer drawn, and the valve is set for a somewhat increased pressure, for example of approximately two to five pounds per square inch.

It is an advantage of this cooling system as described that it requires less liquid coolant than the system disclosed in my Patent No. 3,223,075 and requires far less liquid coolant than is used in a conventional water-cooled engine of equivalent power and size. For summer driving or in geographic locations where the winter temperature remains above freezing, the coolant liquid may be water containing a rust inhibitor. For sub-freezing temperatures a suitable liquid coolant includes water plus "Dowtherm 209," having a property of forming an azeotrope with 47 weight percent water, has an atmospheric boiling point of 209° F. Also, mere azeotropic conditions exist with solutions containing from 30–60 weight percent of Dowtherm, hence, maintaining exact concentration in the ebullient cooling system is not critical. Weather conditions, likewise, present no problem, for Dowtherm pour points range from −80° F. for a 40 weight percent solution to −80° F. for one of 60 percent.

The coolant liquid, for example water containing rust inhibitor is poured in by removing a liquid-tight filler cap 104 (FIGURES 2 and 4) on a fill pipe 105 connected into the side of the compensating chamber 24 at a level so that no more than the recommended quantity of liquid coolant can be introduced into the system. The cold coolant liquid level is shown at L, and the liquid coolant level in the engine jacket 12 remains below the top of the engine block when the engine is cold and not operating. When the engine is started, the engine pump 11 immediately starts pumping liquid coolant from the compensator chamber 24 to fill the jacket 12 about the engine block and to introduce liquid up into the head jacket 18, and at the same time it lowers the liquid level within the compensator chamber 24. Thus, the space gained in the compensator 24 is available to receive the expanded volume of liquid when it reaches the boiling point.

By using the space generally provided for the car heater near the firewall 106 in the engine section beneath the hood 54 this present system gains more space for separating dry vapor from the wet vapor which rises from the compensator to the expansion tank 35 in the car heater assembly 34. The car heater expansion tank 35 enables a much smaller compensator chamber 24 to be used than heretofore and which may now be located in several different and smaller spaces than the larger compensator shown in my Patent No. 3,223,075. Also, by virtue of the smaller compensator 24 less liquid coolant is enabled to be used to fill the cooling system. This smaller quantity of liquid coolant allows for a faster warm-up from cold, it saves weight and reduces expense for the operator. For example, the 385 horsepower engine mentioned previously, when operated as a conventional water-cooled engine is intended to utilize approximately 16 quarts, whereas this same engine when employing the present invention uses approximately 11 quarts.

In operation the level of liquid coolant in the expansion tank 35 varies with the power output of the engine. When the engine is being operated at high power output, greater volumes of vapor are generated, thus displacing more boiling liquid from the jacket and driving more wet vapor up into the expansion tank and raising the level of liquid therein. Conversely, when the engine is being operated at low power output the level of coolant liquid in the expansion tank is lower. The bottom of this tank is positioned above the water line L so that upon shut down of the engine the liquid runs down into the compensating chamber. By virtue of this arrangement a relatively small amount of liquid coolant is required as compared with a conventional water cooled engine of equivalent power output.

I have discovered that utilization of the present invention affords a marked improvement in the starting characteristics of a high-compression automobile engine in extremely cold weather. My experience with the present invention employed in the 385 horsepower high-compression automobile engine discussed above on numerous cold mornings during the winter of 1965-1966 after the automobile had stood all night showed more consistent quick starting by using non-premium fuels. My theory for explaining the marked improvement in cold weather starting characteristics will be described below, but regardless of whether this theory is correct, the improvement in starting such a high-compression engine is obtained by following the teaching of this specification. In extremely cold weather in conventional automobile engines the temperature is so low at starting that there is not sufficient gasoline fuel which is vaporized to produce a combustible fuel vapor and air mixture. Thus, the spark itself must supply the heat to locally vaporize some of the atomized fuel to obtain initial ignition. This initial ignition produces a small flame front which can then spread to a general combustion. Often, a conventional engine kicks over and then the gasoline fuel soaks the deposits on the spark plug electrodes and insulator so that the spark becomes "drowned" in fuel. Then the operator continues to turn the engine over by the starting motor, and more fuel is drawn into the cylinders which aggravates the problem. My theory is that a knock suppressant additive such as lead tetraethyl inhibits the initial ignition and interferes with the spreading of the small flame front into general combustion.

In accordance with the present invention the high-compression engine burns gasoline fuel which is substantially devoid of such knock suppressant additives, thus the fuel is more readily ignited and the flame spreads more rapidly throughout the combustion region. Moreover, the spark occurs effectively at top dead center so that the initial ignition of the fuel aids the starting motor to turn the engine, rather than opposing engine rotation as in the case of the conventional advanced spark. The result is quick, easy starting under severely cold conditions.

As used herein the term "high-compression engine" means an engine having a compression ratio exceeding 8.5 to 1. The term "effectively at top dead center" means within the range from 1.5° advance to 1.5° retard of the spark, because I have discovered that this is the optimum range for a high compression engine using fuel in the absence of knock suppressants. I have also discovered that the engine can be run with a slightly greater advance, but the engine then runs roughly at low speed.

The terms and expressions which I have employed are used in a descriptive and not a limiting sense, and I have no intention of excluding equivalents of the invention described and claimed.

What is claimed is:
1. An improved combustion process for high-compression internal combustion engines of the reciprocating piston type having a compression ratio greater than 8.5 to 1 comprising the steps of charging the high-compression engine with a mixture of air and hydrocarbon fuel in the substantial absence of knock suppressants to produce a detonatable vaporized mixture, compressing the mixture to a high compression level, cooling the engine with a high velocity flow of coolant liquid mixed with coolant vapor, said coolant liquid being at its boiling point and being impelled by its vapor to produce high velocity flow thereof, igniting the compressed vaporized mixture by electricity timed to occur at approximately the time of maximum compression in the respective cylinders, and burning the mixture during the downward stroke of the piston.

2. An improved combustion process as claimed in claim 1 wherein said hydrocarbon fuel is cracked synthetic gasoline having boiling points in the range of approximately 120° F. to 400° F., and said coolant liquid has a boiling point in the range above 200° F. at atmospheric pressure.

3. The process of burning hydrocarbon fuel in high-compression internal combustion engine of the reciprocating type having a compression ratio exceeding 8.5 to 1 permitting the use of faster burning hydrocarbon fuels than are normally used in such high-compression engines comprising the steps of charging the engine with a mixture of air and hydrocarbon fuel in the substantial absence of combustion suppressants, vaporizing and compressing the mixture to a high compression level exceeding a ratio of 8.5 to 1, igniting the compressed mixture at a predetermined time set effectively at top dead center of piston travel, and cooling the engine with a mixture of vapor and coolant liquid at its boiling point, said boiling point lying within the range of the boiling points of said hydrocarbon fuel, whereby more complete combustion occurs than in a conventional internal combustion engine of equivalent rating burning conventional fuels containing combustion suppressants and the mileage per gallon of fuel is substantially increased.

4. The process of burning hydrocarbon fuel as claimed in claim 3 and wherein the hydrocarbon fuel is for year around use in ebullient cooled engines, being a common blend of cracked synthetic gasolines having boiling points lying in the range of approximately 120° F. to 400° F., said common blend being substantially devoid of combustion suppressants such as tetraethyl lead and the like, and the boiling point of the liquid coolant is in the range above 200° F. at atmospheric pressure.

5. An internal combustion process for automotive gasoline engines of the reciprocating piston type comprising the steps of blending a multiplicity of different cracked synthetic gasolines respectively having different boiling points at temperatures spaced between approximately 120° F. and approximately 400° F. and substantially free of all combustion retardants such as tetraethyl lead, and the like, to produce a resultant common standard cracked gasoline fuel of high volatility for year around use regardless of climate, vaporizing said fuel with air in automotive engines maintained at a standard uniform predetermined temperature by ebullient cooling of said engines by a coolant having a boiling temperature at atmospheric pressure in the range from 200° F. to 230° F. to produce a detonatable mixture of vapor and air, and producing detonation combustion of said mixture by igniting said mixture effectively at top dead center of piston travel.

6. An internal combustion process for providing increased efficiency in high-compression engines of the reciprocating type having cylinders defining combustion regions and having pistons therein connected to a crank shaft producing a high-compression stroke of a compression ratio higher than 8.5 to 1, inlet and exhaust valves communicating with said cylinders, spark-plug igniters, and a cooling jacket associated with the cylinders and combustion areas comprising the steps of passing a coolant vapor mixed with coolant liquid at its boiling point at high velocity within and throughout the cooling jacket for substantially uniformly cooling said cylinders, valves, and spark plug igniters, introducing a straight run of cracked synthetic gasoline free of anti-knock additives into air to form an atomized mixture thereof in air, charging the combustion regions of each respective cylinder with said atomized mixture, compressing the mixture by said high-compression stroke higher than 8.5 to 1, igniting the compressed mixture within 1.5° of the top position of the crank shaft of the respective piston, and burning said mixture during the down stroke of the respective pistons.

7. An ebullient cooling system for an automotive internal combustion engine of the reciprocating type having a cooling jacket adapted for a coolant to be circulated therethrough with jacket inflow and jacket outflow connection means and a coolant circulating pump communicating with said jacket inflow connection means, said cooling system comprising a compensating chamber having an upper level receptive of coolant vapor and a lower level containing coolant liquid during operation of said engine, said compensating chamber having a first outlet in the lower level thereof connected to said jacket inflow connection means, a first nozzle communicating with said compensating chamber connected to said jacket outflow connection means and being directed toward said outlet, an expansion tank near the top of the engine compartment having an upper level receptive of coolant vapor and a lower level containing variable amounts of coolant liquid as a function of the engine power output during operation of said engine, said expansion tank having a second outlet in the lower level thereof, a second nozzle communicating with said expansion tank, said second nozzle being connected to the upper level of said compensating chamber and being directed toward said second outlet, a third nozzle communicating with said compensating chamber, said third nozzle being connected to the upper level of said expansion tank and being directed toward said first outlet in parallel flow relationship with said first nozzle, a condenser connected to the upper level of said expansion tank, and a condensate pump connected to the bottom of said condenser for returning the liquid coolant to said system at a level above the variable level of the liquid coolant in said expansion tank.

8. An ebullient cooling system as claimed in claim 7 in which said expansion tank comprises heating means for heating air, and heated air delivery means for delivering the heated air to a passenger compartment for warming the compartment.

9. An ebullient cooling system for an automotive internal combustion engine as claimed in claim 7 and wherein the bottom of the condenser is connected to the upper level of the expansion tank for receiving vapor and at times wet vapor, by virtue of said bottom connection the condenser being freed from the load of passing any liquid therethrough, and the vapor which is condensed by said condenser is mixed with liquid coolant in the bottom of the condenser to heat the coolant and a condensate pump connected to the bottom of the condenser for catching the heated coolant so as to pump said heated coolant back into the system at a temperature near its boiling point, and thus only a minimum amount of heat is required to reheat the condensed coolant to its boiling point in the compensating chamber prior to reentry into the jacket.

10. An ebullient cooling system for an automotive internal combustion engine having a cooling jacket for cooling liquid to circulate therethrough at its boiling point, said jacket having a jacket outlet and a jacket inlet with a pump for circulating coolant through the jacket in a direction from said inlet to said outlet, said cooling system including three coolant flow circuits; said first circuit including said jacket, its inlet and outlet and said pump, said first circuit also including compensating chamber means and first nozzle means connected to said jacket outlet for receiving from the jacket high velocity flow of coolant liquid at its boiling point mixed with coolant vapor, said first nozzle means being arranged to release vapor from said high velocity flow into said compensating chamber means and being arranged to utilize the momentum of said high velocity flow to impell coolant liquid from said compensating chamber means to said jacket inlet for returning coolant liquid substantially at its boiling point to said jacket; said second circuit including expansion tank means and second nozzle means connected to said compensating chamber means for receiving a flow of wet vapor from said compensating chamber means, said second nozzle means being arranged to release into said expansion tank means vapor from said flow of wet vapor and being arranged to impell coolant liquid from said expansion tank means, said second circuit also including third nozzle means for receiving the coolant liquid which has been impelled from said expansion tank means, said third nozzle means being arranged to aid said first nozzle means in impelling liquid coolant from said compensating means to said jacket inlet; said third circuit including a condenser for receiving coolant vapor from said expansion tank means for condensing said vapor, and a condensate pump for pumping the condensate from said condenser back into one of the other circuits.

11. An ebullient cooling system as claimed in claim 10 in which said third circuit includes a connection from the upper portion of said expansion tank means to the lower portion of said condenser, said condensate pump being a centrifugal pump normally positioned at a lower level than the lower portion of said condenser for receiving the condensate by gravity flow from the condenser, and said pump having a discharge connected to the upper portion of said expansion tank means above the normal level of the liquid coolant therein.

12. The process of controlled detonation of fuel in high-compression internal combustion gasoline engines of the reciprocating piston type having a compression ratio exceeding 8.5 to 1 comprising the steps of charging the engine with a mixture of air and hydrocarbon fuel in the substantial absence of knock suppressants and said fuel having boiling points in the range of approximately 120° F. to 400° F., vaporizing and compressing the mixture of air and fuel to a compression level exceeding a ratio 8.5 to 1, igniting said compressed mixture by an electric spark at the effective top dead center of piston travel, controlling the detonation pressures of said fuel by the downward motion of the piston during the power stroke, and cooling the engine by circulating boiling coolant throughout the liquid jacket of the motor in heat exchange relation with the engine, said coolant having a boiling temperature at atmospheric pressure in the range from 200° F. to 230° F., as a result of all the steps of said process the mileage per gallon of fuel is substantially increased and the contaminants released into the atmosphere are substantially decreased.

13. A high-compression automotive engine and fuel system providing ease of starting in cold winter weather, said engine and fuel system including a high-compression reciprocating engine having a cooling jacket, ebullient cooling means for circulating coolant liquid at its boiling temperature through said jacket during engine operation at normal temperature, ignition means having the spark timed to occur effectively at top dead center, and fuel substantially devoid of knock suppressant additives, such as lead tetraethyl and the like.

14. An ebullient cooling system for an automotive internal combustion engine having cooling jacket means for coolant to circulate through said jacket means and a pump for the coolant; said cooling system comprising a first chamber having an upper level receptive of coolant vapor and a lower level containing coolant liquid during operation of said engine, said first chamber having a first outlet communicating with the lower level thereof for connection to said jacket means to circulate coolant to said jacket means, said first chamber means having first inlet means for connection to said jacket means for receiving from said jacket means a high velocity flow of coolant liquid at its boiling point mixed with coolant vapor, said first inlet means releasing vapor into said first chamber from said high velocity flow and said inlet means utilizing the momentum of said high velocity flow to impell coolant liquid from said first chamber through said first outlet, a tank in cascaded relationship with said first chamber, said tank having an upper level receptive of coolant vapor and a lower level receptive of coolant liquid during operation of said engine, said tank having a second outlet communicating with the lower level thereof, said tank having second inlet means connected to the upper level of said first chamber for receiving therefrom a flow of wet vapor, said second inlet means releasing vapor into said tank from said flow of wet vapor and said second inlet means utilizing the momentum of said flow to impel coolant liquid through said second outlet, said first chamber having third inlet means connected to said second outlet for receiving coolant flow therefrom to return coolant to said first chamber, a condenser connected to said system at an upper level thereof for receiving coolant vapor to be condensed, and a condensate pump connected to the bottom of said condenser for returning condensed liquid coolant to said system.

15. An ebullient cooling system for an automotive internal combustion engine as claimed in claim 14 in which said third inlet means is arranged to utilize the momentum of coolant flow to aid said first inlet means to impel coolant liquid from said first chamber through said first outlet.

16. An improved combustion process for high-compression internal combustion engines of the reciprocating piston type having a compression ratio greater than 8.5 to 1 for increasing the efficiency of said engines during operation and improving their characteristics during starting in winter weather comprising the steps of cooling the cylinders and head of the high compression engine with a flow of coolant liquid which during operation is at its boiling point, propelling said flow to a high velocity by the increase in volume of said flow as vapor is produced by heat flow from the cylinders and head, charging the cylinders with a mixture of air and cracked synthetic gasoline fuel without knock suppressant material such as lead tetraethyl, vaporizing fuel in said cylinders and compressing the fuel and air mixture to a high compression level, igniting the compressed mixture effectively at top dead center of piston travel in the cylinders, and thereafter burning said compressed fuel and air mixture without suppressant material such as lead tetraethyl.

17. An improved combustion process for high-compression internal combustion engines of the reciprocating piston type having a compression ratio greater than 8.5 to 1 comprising the steps of providing cracked synthetic gasoline fuel without knock suppressant material such as lead tetraethyl, charging the cylinders of such high-compression engine with a mixture of air and said fuel, compressing the mixture to a high compression level, cooling the engine with a high velocity flow of coolant liquid at its boiling point mixed with coolant vapor, igniting the compressed mixture at effectively top dead center of piston travel in each cylinder, and thereafter burning said mixture.

References Cited by the Examiner
UNITED STATES PATENTS

| | | | |
|---|---|---|---|
| 1,939,614 | 12/1933 | Weinberg | 123—1 |
| 2,011,986 | 8/1935 | Schwarz | 123—75 X |
| 2,016,023 | 10/1935 | Price | 123—179 |
| 2,283,594 | 5/1942 | Aspin. | |
| 2,348,621 | 5/1944 | Hanlon | 123—180 |
| 2,473,171 | 6/1949 | Ostling | 123—117 |
| 2,484,009 | 10/1949 | Barber | 123—32 |
| 2,552,555 | 5/1951 | Houdry | 123—1 |
| 3,223,075 | 12/1965 | Barlow | 123—41.24 |

MARK NEWMAN, *Primary Examiner.*

AL LAWRENCE SMITH, *Examiner.*